(12) United States Patent
Kameda et al.

(10) Patent No.: US 12,074,486 B2
(45) Date of Patent: Aug. 27, 2024

(54) ROTOR MANUFACTURING METHOD

(71) Applicant: NHK SPRING CO., LTD., Yokohama (JP)

(72) Inventors: Yohei Kameda, Yokohama (JP); Yu Yoda, Yokohama (JP)

(73) Assignee: NHK SPRING CO., LTD., Yokohama (JP)

(*) Notice: Subject to any disclaimer, the term of this patent is extended or adjusted under 35 U.S.C. 154(b) by 429 days.

(21) Appl. No.: 17/421,537

(22) PCT Filed: Jan. 14, 2020

(86) PCT No.: PCT/JP2020/000849
§ 371 (c)(1),
(2) Date: Jul. 8, 2021

(87) PCT Pub. No.: WO2020/145410
PCT Pub. Date: Jul. 16, 2020

(65) Prior Publication Data
US 2022/0103029 A1  Mar. 31, 2022

(30) Foreign Application Priority Data
Jan. 11, 2019 (JP) .................................. 2019-003620

(51) Int. Cl.
*H02K 15/12* (2006.01)
*H02K 15/03* (2006.01)
*H02K 1/276* (2022.01)

(52) U.S. Cl.
CPC ............. *H02K 15/12* (2013.01); *H02K 15/03* (2013.01); *H02K 1/276* (2013.01); *Y10T 29/49012* (2015.01)

(58) Field of Classification Search
CPC ........ H02K 15/03; H02K 15/12; H02K 1/276; H02K 15/02; H02K 1/27; H02K 15/00;
(Continued)

(56) References Cited

U.S. PATENT DOCUMENTS 6,930,432 B2 * 8/2005 Maeda ................. H02K 21/044
310/263
2011/0057529 A1 3/2011 Seidel et al.
(Continued)

FOREIGN PATENT DOCUMENTS

DE   102014214381   1/2016
JP   2000354342    12/2000
(Continued)

OTHER PUBLICATIONS

Japanese Office Action (w/ English translation) for corresponding Japanese Application No. 2020-561096, dated Dec. 6, 2021, 15 pages.
(Continued)

*Primary Examiner* — Thiem D Phan
(74) *Attorney, Agent, or Firm* — Dority & Manning, P.A.

(57) ABSTRACT

A rotor includes a rotor core configured by laminated steel plates and a magnet insertion hole extending along an axial direction of the rotor core, with a resin interposed between a permanent magnet placed in the magnet insertion hole and an inner wall face of the magnet insertion hole. In a manufacturing method for this rotor, in a first process, the permanent magnet and the resin are integrated together to manufacture a resin-coated permanent magnet. Next, in a second process, the resin-coated permanent magnet is press-fitted into the magnet insertion hole. Next, in a third process, the post-second-process rotor core is heated to a temperature that is at least the temperature at which the resin softens. Next, in a fourth process, the post-third process rotor core is cooled.

10 Claims, 16 Drawing Sheets

(58) Field of Classification Search
CPC ......... Y10T 29/49012; Y10T 29/49009; Y10T 29/49075; Y10T 29/49078
USPC ........................ 29/598, 596, 602.1, 607, 609
See application file for complete search history.

(56) References Cited

U.S. PATENT DOCUMENTS

| | | | |
|---|---|---|---|
| 2014/0196276 | A1 | 7/2014 | Nagai et al. |
| 2017/0302141 | A1* | 10/2017 | Yokota ................... H02K 15/03 |

FOREIGN PATENT DOCUMENTS

| | | | | |
|---|---|---|---|---|
| JP | A 2005-094845 | 4/2005 | | |
| JP | A 2006-174537 | 6/2006 | | |
| JP | A 2006-311782 | 11/2006 | | |
| JP | 2009171785 | * 7/2009 | ............ | Y02T 10/64 |
| JP | A 2009-171785 | 7/2009 | | |
| JP | A 2014-138448 | 7/2014 | | |
| JP | A 2015-089169 | 5/2015 | | |
| JP | A 2015-220974 | 12/2015 | | |
| JP | A 2017-163734 | 9/2017 | | |
| JP | B 6383745 | 8/2018 | | |

OTHER PUBLICATIONS

Extended European Search Report for European Patent Application No. 20737971, dated Sep. 9, 2022, 8 pages.

* cited by examiner

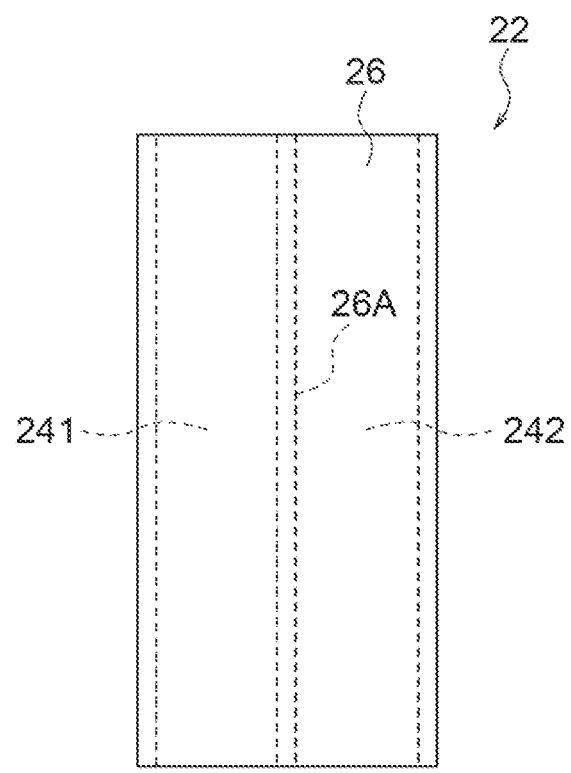

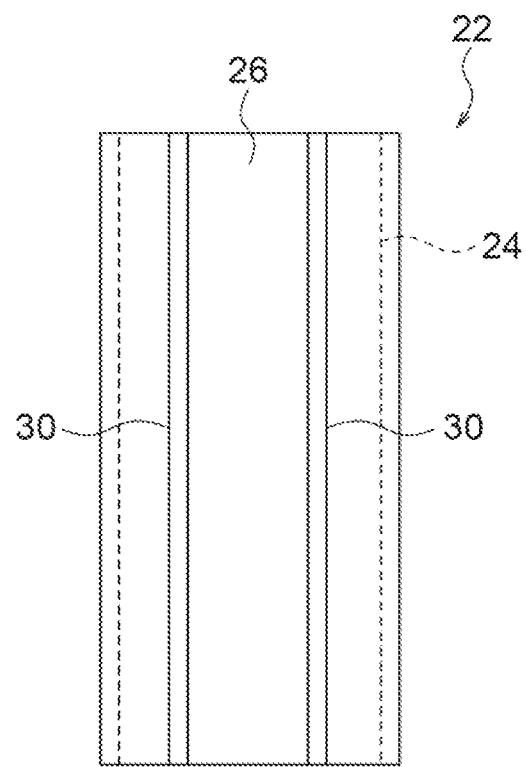

ROTOR MANUFACTURING METHOD

CROSS-REFERENCE TO RELATED APPLICATIONS

The present application is related and has right of priority to JP 2019-003620, which was filed on Jan. 11, 2019 in the Japanese Patent Office, and is a U.S. national phase entry of PCT/JP2020/000849, which was filed on Jan. 14, 2020, both of which are incorporated by reference in their entireties for all purposes.

TECHNICAL FIELD

The present disclosure relates to a rotor for a rotating electrical device and a manufacturing method thereof.

BACKGROUND ART

Japanese Patent No. 6383745 discloses a manufacturing method for a rotor of a rotating electrical device including a rotor core configured by plural laminated steel plates and by plural magnet insertion holes formed around a circumferential direction, permanent magnets disposed in the magnet insertion holes, and resin portions positioned between the respective permanent magnets and inner wall faces of the magnet insertion holes. This manufacturing method includes an integration process in which the permanent magnets and the resin portions are integrated together such that the periphery of the permanent magnets are enveloped in the resin portions to form resin-coated permanent magnet bodies having a profile slightly smaller than the magnet insertion holes, a placement process in which the resin-coated permanent magnet bodies are placed in the magnet insertion holes, and a close fitting process in which the resin-coated permanent magnet bodies are fitted closely against the inner wall faces of the magnet insertion holes following the placement process. A heating process to heat the resin-coated permanent magnet bodies may be incorporated prior to the close fitting process.

In the integration process described above, the resin-coated permanent magnet bodies are formed so as to include an extra thickness portion covering at least one axial direction end face of the permanent magnet. In the close fitting process, the extra thickness portion is press-fitted in the axial direction in order to give a close fit between the resin-coated permanent magnet bodies and the inner wall faces of the magnet insertion holes. Accordingly, any spaces between the steel plates caused due to steps when laminating the steel plates are filled with the resin.

Japanese Patent Application Laid-Open (JP-A) No. 2015-89169 discloses a rotor manufacturing method in which a coated magnet configured by providing a permanent magnet with a film layer made of a resin material is inserted into an insertion hole formed in a rotor core in order to fix the permanent magnet to the rotor core in an embedded form. In this manufacturing method, a permanent magnet capable of being inserted into the insertion hole without contacting an inner peripheral face of the insertion hole is employed, and the coated magnet has a profile capable of being press-fitted into the insertion hole. The coated magnet is inserted (lightly press-fitted) into the insertion hole in a state in which the rotor core has been heated to a temperature that is at least the melting temperature of the resin material. The resin accordingly achieves a close fit against small undulations on the inner peripheral face of the insertion hole.

SUMMARY OF INVENTION

Technical Problem

In the manufacturing method disclosed in Japanese Patent No. 6383745, when the extra thickness portions of the resin portions are pressed in the close fitting process, the resin of the extra thickness portions spreads in a plane direction of an axial direction end face of the rotor core, which might result in inadequate filling of the magnet insertion holes with the resin. Moreover, due to pressing the extra thickness portions of the resin portions at the axial direction end face of the rotor core, a deformation amount of the resin portions themselves increases. Accordingly, even if the resin portions are softened during the heating process, due to the large deformation resistance of the resin portions, the resin might not adequately fill gaps between the steel plates caused by steps. Should locations that are not adequately filled by the resin arise between the inner wall faces of the magnet insertion holes and the permanent magnets for the above reason, centrifugal force acting on the permanent magnets as the rotor rotates could become concentrated on the locations of the inner wall faces of the magnet insertion holes that are filled by the resin, which might result in premature damage at such locations.

In the manufacturing method disclosed in JP-A No. 2015-89169, when lightly press-fitting the coated magnet into the insertion hole in the heated rotor core, the resin portion of the coated magnet is softened using radiant heat from the rotor core. In a worst-case scenario, the resin might be locally shaved away by coming into contact with an edge portion at the entrance of the insertion hole. In such cases, should locations that are not adequately filled by the resin arise between the inner wall face of the insertion hole and the permanent magnet, centrifugal force acting on the permanent magnet as the rotor rotates could become concentrated on locations of the inner wall face of the insertion hole that are filled by the resin, which might result in premature damage at such locations.

In consideration of the above circumstances, an object of the present disclosure is to obtain a rotor manufacturing method and a rotor capable of preventing premature damage of a rotor core resulting from centrifugal force acting on a permanent magnet as the rotor rotates concentrating locally on an inner wall face of a magnet insertion hole.

Solution to Problem

A rotor manufacturing method of a first aspect of the present disclosure is a manufacturing method for a rotor including a rotor core configured by laminated steel plates and by a magnet insertion hole extending along an axial direction of the rotor core, with a resin interposed between a permanent magnet placed in the magnet insertion hole and an inner wall face of the magnet insertion hole. The rotor manufacturing method includes a first process of integrating the permanent magnet and the resin together to manufacture a resin-coated permanent magnet capable of being press-fitted into the magnet insertion hole, a second process of press-fitting the resin-coated permanent magnet into the magnet insertion hole, a third process of heating the post-second-process rotor core to a temperature that is at least a temperature at which the resin softens, and a fourth process of cooling the post-third process rotor core.

In the rotor manufacturing method of the first aspect, the rotor is manufactured including the rotor core configured by the laminated steel plates and by the magnet insertion hole extending along the axial direction of the rotor core, and with the resin interposed between the permanent magnet placed in the magnet insertion hole and the inner wall face of the magnet insertion hole. According to this manufacturing method, in the first process, the permanent magnet and the resin are integrated together to manufacture the resin-coated permanent magnet that is capable of being press-fitted into the magnet insertion hole in the rotor core. Next, in the second process, the resin-coated permanent magnet is press-fitted into the magnet insertion hole in the rotor core. Next, in the third process, the post-second-process rotor core is heated to a temperature that is at least the temperature at which the resin softens. Accordingly, the softened resin is pressed in a rotor radial direction against the inner wall face of the magnet insertion hole and deformed so as to be fitted closely against undulations of the inner wall face. Next, in the fourth process, the rotor core that was heated in the third process is cooled, such that the magnet insertion hole is returned to its room temperature size while maintaining this closely fitted state.

In this manufacturing method, the resin-coated permanent magnet is press-fitted into the magnet insertion hole in the rotor core prior to heating the rotor core. This enables the resin to be prevented or suppressed from being locally shaved away on the side that comes into contact with an edge portion at the entrance of the magnet insertion hole during the press-fitting. Moreover, since the softened resin is pressed in the rotor radial direction against the inner wall face of the magnet insertion hole and deformed, there is less deformation resistance of the resin than in traditional configurations in which a resin portion is filled into a magnet insertion hole by being pressed in an axial direction of a rotor core. This enables the resin to be well fitted closely against (filled into) the undulations of the inner wall face of the magnet insertion hole. As a result, centrifugal force acting on the permanent magnet as the rotor rotates acts uniformly on the inner wall face of the magnet insertion hole, thereby enabling premature damage of the rotor core due to local concentration of the centrifugal force on the inner wall face of the magnet insertion hole to be prevented.

A rotor manufacturing method of a second aspect of the present disclosure is a manufacturing method for a rotor including a rotor core configured by laminated steel plates and by a magnet insertion hole extending along an axial direction of the rotor core, with a resin interposed between a permanent magnet placed in the magnet insertion hole and an inner wall face of the magnet insertion hole. The rotor manufacturing method includes a first process of integrating the permanent magnet and the resin together to manufacture a resin-coated permanent magnet larger than the magnet insertion hole in a rotor radial direction, a second process of heating the rotor core to a temperature that is at least a temperature at which the magnet insertion hole enlarges to a size to allow contact-free insertion of the resin-coated permanent magnet and that is also at least a temperature at which the resin softens, a third process of inserting the resin-coated permanent magnet into the magnet insertion hole in the rotor core in a heated state achieved by the second process, and a fourth process of cooling the post-third process rotor core.

In the rotor manufacturing method of the second aspect, the rotor is manufactured including the rotor core configured by the laminated steel plates and by the magnet insertion hole extending along the axial direction of the rotor core, and with the resin interposed between the permanent magnet placed in the magnet insertion hole and the inner wall face of the magnet insertion hole. According to this manufacturing method, in the first process, the permanent magnet and the resin are integrated together to manufacture the resin-coated permanent magnet that is larger in the rotor radial direction than the magnet insertion hole in the rotor core. Next, in the second process, the rotor core is heated to a temperature that is at least the temperature at which the magnet insertion hole enlarges to a size to allow contact-free insertion of the resin-coated permanent magnet and that is also at least the temperature at which the resin softens. Next, in the third process, the resin-coated permanent magnet is inserted into the magnet insertion hole in the rotor core in the heated state achieved by the second process. The resin of the resin-coated permanent magnet is thus softened using radiant heat from the rotor core. Next, in the fourth process, the post-third process rotor core is cooled. The magnet insertion hole that has been enlarged by the above-described heating contracts as a result, such that the softened resin is pressed in the rotor radial direction against the inner wall face of the magnet insertion hole and deformed so as to be fitted closely against the undulations of the inner wall face. The magnet insertion hole is then returned to its room temperature size while maintaining this closely fitted state.

In this manufacturing method, the resin-coated permanent magnet is inserted into the magnet insertion hole that has been enlarged by the above-described heating. This enables the resin to be prevented from being locally shaved away by corning into contact with an edge portion at the entrance of the magnet insertion hole. Moreover, since the softened resin is pressed in a rotor radial direction against the inner wall face of the magnet insertion hole and deformed, there is less deformation resistance of the resin than in traditional configurations in which a resin portion is filled into a magnet insertion hole by being pressed in an axial direction of a rotor core. This enables the resin to be well fitted closely against (filled into) the undulations of the inner wall face of the magnet insertion hole. As a result, centrifugal force acting on the permanent magnet as the rotor rotates acts uniformly on the inner wall face of the magnet insertion hole, thereby enabling premature damage of the rotor core due to a local concentration of the centrifugal force on the inner wall face of the magnet insertion hole to be prevented.

A rotor manufacturing method of a third aspect of the present disclosure is the rotor manufacturing method of either the first aspect or the second aspect, wherein, of a rotor radial outer side face and a rotor radial inner side face of the permanent magnet, in the first process, the resin is only adhered to the rotor radial outer side face.

In the rotor manufacturing method of the third aspect, in the first process, the resin is only adhered to the rotor radial outer side face from out of the rotor radial outer side face and the rotor radial inner side face of the permanent magnet when manufacturing the resin-coated permanent magnet. Thus, when the resin-coated permanent magnet is placed in the magnet insertion hole in the rotor core, the resin is not present at the rotor radial inside of the permanent magnet, but the resin is present at the rotor radial outside of the permanent magnet. Although an increased centrifugal force from the permanent magnet is applied to the inner wall face of the magnet insertion hole at the rotor radial outside of the permanent magnet as the rotor rotates, since the resin is well fitted closely against the undulations of the inner wall face of the magnet insertion hole, this centrifugal force is applied uniformly to the inner wall face of the magnet insertion hole. Moreover, the quantity of the resin employed can be reduced in comparison to configurations in which the resin is also present at the rotor radial inside of the permanent magnet, thus contributing to a reduction in weight and a reduction in manufacturing costs of the rotor.

A rotor manufacturing method of a fourth aspect of the present disclosure is the rotor manufacturing method of any one of the first aspect to the third aspect, wherein in the first process, the resin-coated permanent magnet is manufactured to a size at which a gap is formed between the resin-coated permanent magnet and both rotor circumferential direction end portions of the magnet insertion hole.

In the rotor manufacturing method of the fourth aspect, the resin-coated permanent magnet manufactured in the first process is formed to a size at which the gap is formed between the resin-coated permanent magnet and both rotor circumferential direction end portions of the respective magnet insertion hole in a state in which the resin-coated permanent magnet has been placed in the magnet insertion hole. Accordingly, for example in the second process, when an end portion of the resin-coated permanent magnet is press-fitted or inserted into the magnet insertion hole while the end portion of the resin-coated permanent magnet is gripped by a leading end portion of a clamp, the leading end portion of the clamp can be inserted into the gap. This enables the configuration of the clamp used to grip the end portion of the resin-coated permanent magnet to be simplified.

A rotor manufacturing method of a fifth aspect of the present disclosure is the rotor manufacturing method of any one of the first aspect to the fourth aspect, wherein in the first process, plural of permanent magnets are integrated together with the resin.

In the rotor manufacturing method of the fifth aspect, in the first process, the plural permanent magnets are integrated together with the resin when manufacturing the resin-coated permanent magnet. In a rotor in which the resin-coated permanent magnet is placed in the magnet insertion hole in the rotor core, placing the plural permanent magnets in the magnet insertion hole enables the formation of eddy currents to be suppressed. Moreover, by integrating together the plural permanent magnets and the resin as described above, the number of processes can be reduced in comparison to cases in which the plural permanent magnets are placed in the magnet insertion hole separately.

A rotor manufacturing method of a sixth aspect of the present disclosure is the rotor manufacturing method of any one of the first aspect to the fifth aspect, wherein in the first process, a surface of the permanent magnet or of the permanent magnet coated with resin is subjected to roughening processing prior to integrating the permanent magnet and the resin together.

In the rotor manufacturing method of the sixth aspect, in the first process, the surface of the permanent magnet or of the permanent magnet coated with resin is subjected to roughening processing prior to integrating the permanent magnet and the resin together. Integrating the permanent magnet and the resin together in this manner enables the close fit between the two to be improved.

A rotor of a seventh aspect of the present disclosure includes a rotor core configured by laminated steel plates and by a magnet insertion hole extending along an axial direction of the rotor core, a permanent magnet placed in the magnet insertion hole, and a resin integrated together with the permanent magnet and interposed between the permanent magnet and an inner wall face of the magnet insertion hole. The resin is pressed in a rotor radial direction against the inner wall face and deformed so as to be fitted closely against undulations of the inner wall face.

In the rotor of the seventh aspect, the rotor core configured by the laminated steel plates includes the magnet insertion hole extending along the axial direction of the rotor core, and the resin is interposed between the permanent magnet placed in the magnet insertion hole and the inner wall face of the magnet insertion hole. The resin is pressed in the rotor radial direction against the inner wall face of the magnet insertion hole and deformed so as to be well fitted closely against the undulations of the inner wall face of the magnet insertion hole. As a result, centrifugal force acting on the permanent magnet as the rotor rotates acts uniformly on the inner wall face of the magnet insertion hole, thereby enabling premature damage of the rotor core due to a local concentration of the centrifugal force on the inner wall face of the magnet insertion hole to be prevented.

A rotor of an eighth aspect of the present disclosure is the rotor of the seventh aspect, wherein a residual stress at a peripheral portion of the magnet insertion hole in the rotor core is set to no greater than 10 MPa.

In the rotor of the eighth aspect, the resin that is interposed between the permanent magnet placed in the magnet insertion hole in the rotor core and the inner wall face of the magnet insertion hole is pressed in the rotor radial direction against the inner wall face of the magnet insertion hole and deformed, resulting in a smaller deformation amount of the resin than in traditional configurations in which a resin portion is filled into a magnet insertion hole by pressing the resin portion in the axial direction of a rotor core. Since the residual stress at the peripheral portion of the magnet insertion hole in the rotor core is set to no greater than 10 MPa, deformation of this peripheral portion over time can be suppressed, enabling premature damage of the rotor core accompanying such deformation to be prevented.

Advantageous Effects of Invention

As described above, the rotor manufacturing method and the rotor according to the present disclosure enable premature damage of the rotor core resulting from centrifugal force acting on the permanent magnet as the rotor rotates concentrating locally on the inner wall face of the magnet insertion hole to be prevented.

BRIEF DESCRIPTION OF DRAWINGS

FIG. 7A is a front view illustrating a second modified example of a resin-coated permanent magnet;

FIG. 9A is a front view illustrating a fourth modified example of a resin-coated permanent magnet;

DESCRIPTION OF EMBODIMENTS

Explanation follows regarding a rotor manufacturing method and a rotor 10 according to an exemplary embodiment of the present disclosure, with reference to FIG. 1 to FIG. 9C. The rotor 10 according to this exemplary embodiment of the present disclosure is manufactured by the rotor manufacturing method according to this exemplary embodiment of the present disclosure. First, explanation follows regarding configuration of the rotor 10.

Figure 1:
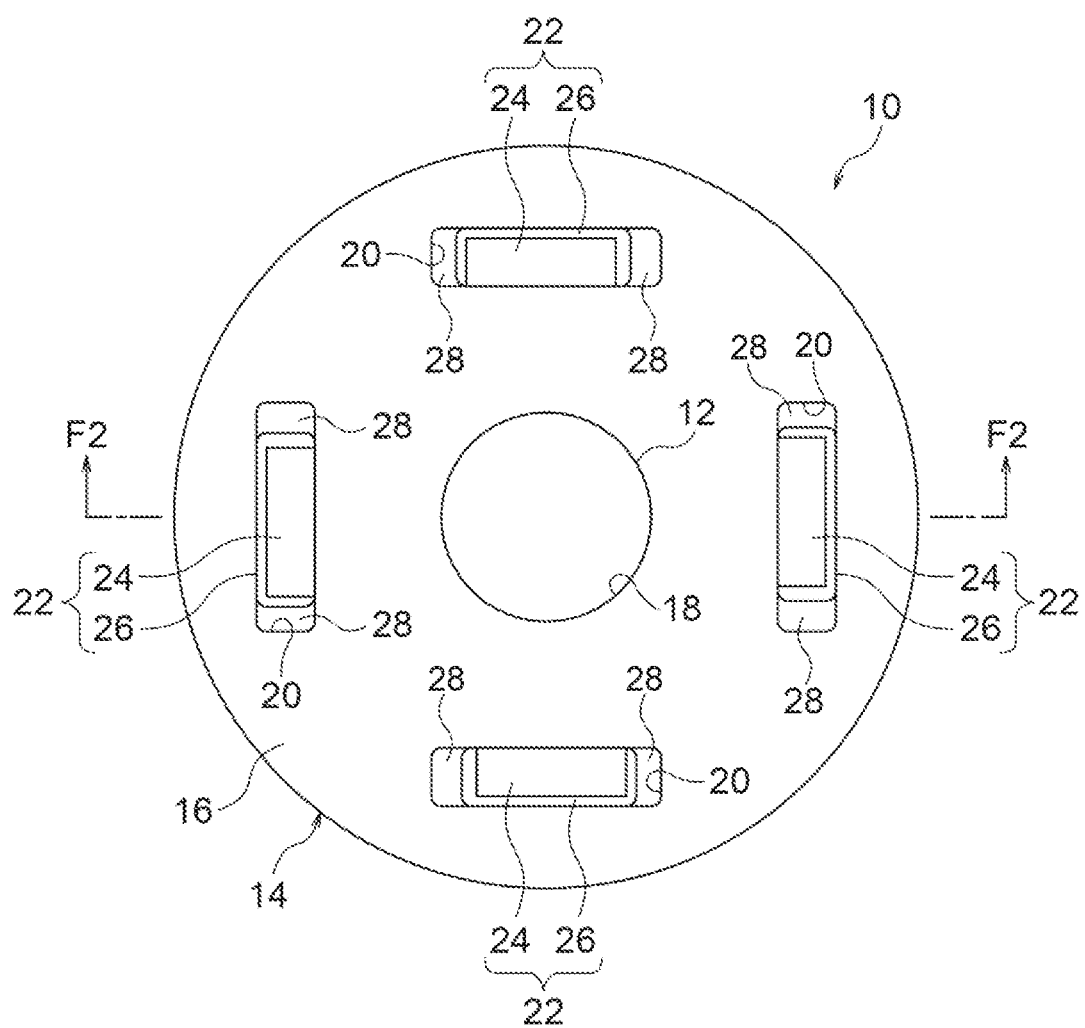
FIG. 1 is a plan view illustrating a rotor according to an exemplary embodiment of the present disclosure.
Figure 2:
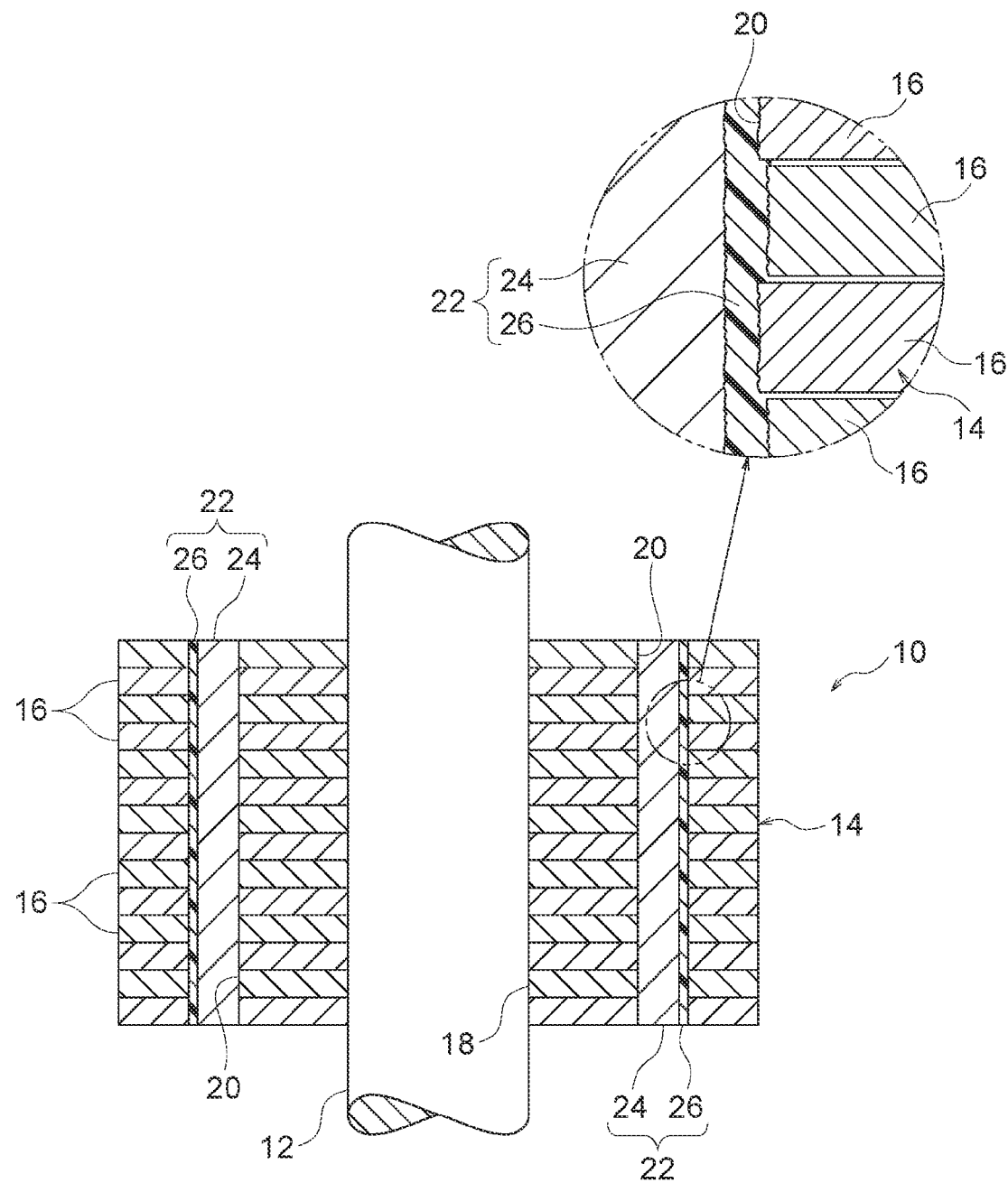
FIG. 2 is a cross-section illustrating a cross-section plane as sectioned along line F2-F2 in FIG. 1.

The rotor 10 according to the present exemplary embodiment is a rotor of an in-runner type rotating electrical device. As illustrated in FIG. 1 and FIG. 2, the rotor 10 is configured including a rotor core 14 coaxially integrated and fixed to a rotation shaft 12 of the rotating electrical device, and resin-coated permanent magnets 22 embedded in the rotor core 14.

The rotor core 14 is configured of laminated steel plates, namely plural steel plate electromagnets 16 laminated together, to form a circular column shape. A fitting hole 18 is formed penetrating the rotor core 14 in an axial direction at a central portion of the rotor core 14. The rotation shaft 12 is press-fitted into the fitting hole 18 so as to fix the rotor core 14 to the rotation shaft 12.

Plural magnet insertion holes 20 (four in this example) are formed penetrating an outer peripheral portion of the rotor core 14 in the axial direction of the rotor core 14. The magnet insertion holes 20 are arranged at uniform intervals around a circumferential direction of the rotor core 14, and have substantially rectangular shaped profiles extending with their length aligned with the rotor circumferential direction (specifically, directions orthogonal to radial directions of the rotor as viewed along the rotor axial direction). As described above, the rotor core 14 is a laminated body configured from the plural steel plate electromagnets 16, and so misalignment during lamination or the like results in the formation of small undulations (steps) at inner wall faces of the respective magnet insertion holes 20 (see FIG. 2). The resin-coated permanent magnets 22 are placed in the respective magnet insertion holes 20.

As illustrated in FIG. 1 to FIG. 3C, each of the resin-coated permanent magnets 22 is configured by a permanent magnet 24 disposed inside the corresponding magnet insertion hole 20, and a thermoplastic resin (resin portion) 26 that is integrated together with the permanent magnet 24 and is interposed between the permanent magnet 24 and an inner wall face of the magnet insertion hole 20. The resin-coated permanent magnets 22 are formed in rectangular plate shapes with their length running along the rotor axial direction and a plate thickness direction running in a rotor radial direction. The permanent magnets 24 are segment magnets configured by sintered magnets or the like, and are formed in rectangular plate shapes with their length running along the rotor axial direction and plate thickness direction running in a rotor radial direction. As viewed along the rotor axial direction, the permanent magnets 24 have a rectangular cross-section profile that is long in the length direction of the respective magnet insertion holes 20. The permanent magnets 24 are formed slightly smaller than the magnet insertion holes 20 as viewed along the rotor axial direction, and are capable of being inserted into the magnet insertion holes 20 without making contact therewith.

Figure 3A:
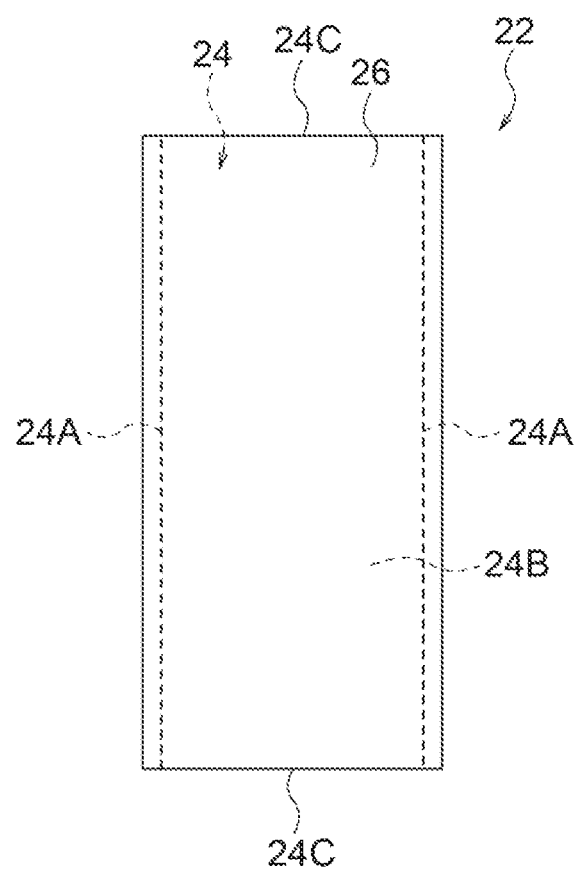
FIG. 3A is a front view illustrating a resin-coated permanent magnet.
Figure 3B:
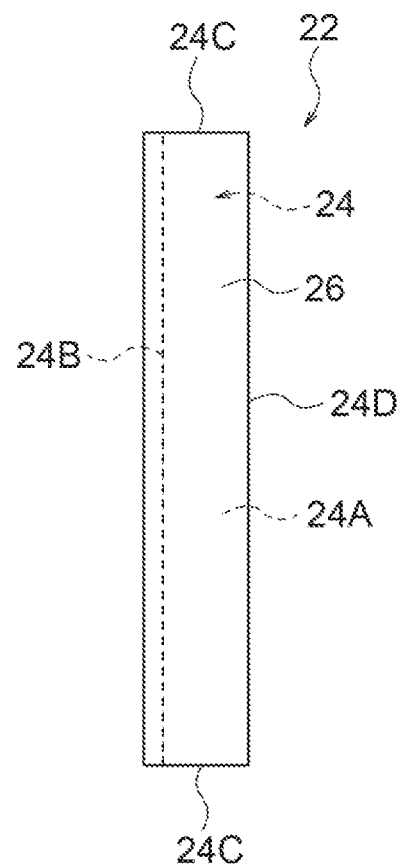
FIG. 3B is a side view illustrating a resin-coated permanent magnet.
Figure 3C:
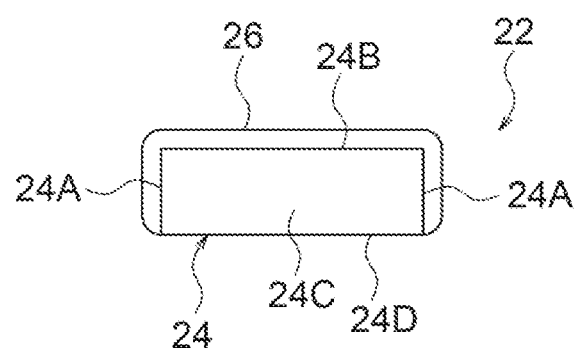
FIG. 3C is a plan view illustrating a resin-coated permanent magnet.

The resin 26 is integrated to the corresponding permanent magnet 24 by insert molding or the like, and adheres to the permanent magnet 24 so as to envelop the periphery of the permanent magnet 24. Note that in the present exemplary embodiment, the resin 26 is formed so as to expose a portion of the permanent magnet 24. Specifically, as illustrated in FIG. 3A to FIG. 3C, the resin 26 is adhered to both short-direction end faces 24A and a rotor radial outer side face 24B of the permanent magnet 24. However, the resin 26 is not adhered to length direction end faces 24C or a rotor radial inner side face 24D of the permanent magnet 24. Note that configuration may be made such that the permanent magnet 24 and the resin 26 are integrated together by a means such as adhesion.

Figure 4A:
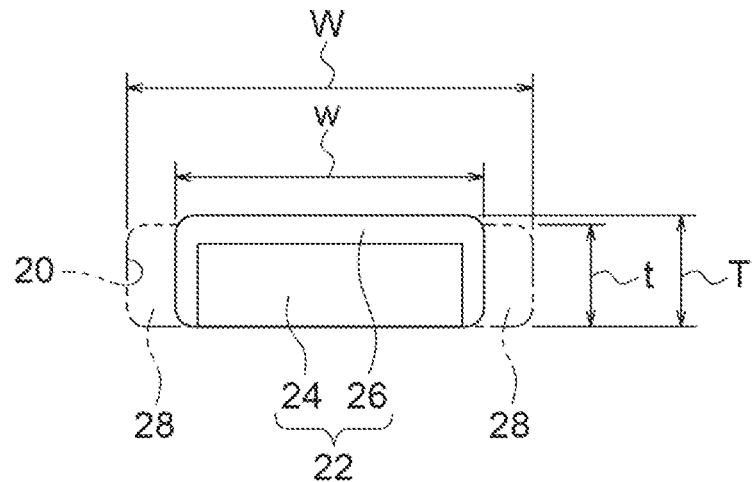
FIG. 4A is a plan view illustrating a state prior to press-fitting a resin-coated permanent magnet into a magnet insertion hole in a first manufacturing method.

The resin-coated permanent magnets 22 configured as described above are manufactured to a size that enables the resin-coated permanent magnets 22 to be press-fitted into the magnet insertion holes 20 at room temperature. Specifically, a thickness dimension T (see FIG. 4A) of the resin-coated permanent magnets 22 prior to being placed in the magnet insertion holes 20 is set slightly larger than a short-direction dimension t of the magnet insertion holes 20 as viewed along the rotor axial direction. Moreover, the resin-coated permanent magnets 22 are formed to a size at which gaps 28 are formed between the resin-coated permanent magnets 22 and both rotor circumferential direction end portions (both length direction end portions as viewed along the rotor axial direction) of the respective magnet insertion holes 20 in a state in which the resin-coated permanent magnets 22 have been placed in the magnet insertion holes 20. Namely, as illustrated in FIG. 4A, a width dimension w (a length dimension as viewed along the rotor axial direction) of the resin-coated permanent magnets 22 is set smaller than a width dimension W of the magnet insertion holes 20.

In each of the resin-coated permanent magnets 22, a location of the resin 26 positioned at the rotor radial outside of the permanent magnet 24 is closely fitted to a location of the inner wall face positioned at the rotor radial outside of the magnet insertion hole 20 (see FIG. 2). Specifically, the resin 26 is heated to a softened state and then pressed in the rotor radial direction against the inner wall face of the magnet insertion hole 20 and deformed so as to cause the resin 26 to fit closely against the undulations of the inner wall face of the magnet insertion hole 20. In the present exemplary embodiment a "close fit" refers to, for example, at least a 70% rate of contact between the resin 26 and the inner wall face of the magnet insertion hole 20.

In the rotor 10 configured as described above, a residual stress at peripheral portions (hole edges) of the magnet insertion holes 20 in the rotor core 14 is set comparatively low (no greater than 10 MPa in the present exemplary embodiment). This is since in cases in which the resin 26 is pressed in the rotor radial direction against the inner wall faces of the magnet insertion holes 20 in order to be well fitted closely against the undulations of the inner wall faces of the magnet insertion holes 20, there is less deformation resistance of the resin 26 than in cases in which the resin 26 is pressed in the axial direction of the rotor core 14 in order to be fitted closely against the undulations of the inner wall faces of the magnet insertion holes 20.

Note that in the present exemplary embodiment, a thermoplastic resin is employed for the resin 26 of the resin-coated permanent magnets 22. However, there is no limitation thereto, and the resin employed for the resin-coated permanent magnets may be a thermosetting resin. Since thermosetting resins soften when heated to a higher temperature than their glass transition temperature even after hardening (for example after insert molding with the permanent magnets 24), thermosetting resins can be fitted closely against the undulations of the inner wall faces of the magnet insertion holes 20 by softening in this manner. Lowering the temperature post-heating allows the thermosetting resin to harden while maintaining this closely fitted state.

Next, explanation follows regarding the manufacturing method of the rotor 10 configured as described above. In the present exemplary embodiment, explanation is given regarding a first and a second manufacturing method as manufacturing methods of the rotor 10. In the first and second manufacturing methods, the rotor 10 is manufactured by performing a first process to a fourth process. A process to manufacture the rotor core 14 by laminating together the steel plate electromagnets 16 is provided before at least the second process. First, explanation follows regarding the first manufacturing method with reference to FIG. 4A to FIG. 4C, followed by explanation regarding the second manufacturing method.

First Manufacturing Method

In the first process of the first manufacturing method, permanent magnets 24 and the resin 26 are integrated together by insert molding, and the resin-coated permanent magnets 22 are manufactured to be capable of being press-fitted into the magnet insertion holes 20 in the rotor core 14 (see FIG. 4A). Note that in the present exemplary embodiment, in the first process, the resin 26 is only adhered to the rotor radial outer side face 24B from out of the rotor radial outer side face 24B and the rotor radial inner side face 24D of each of the permanent magnets 24. Moreover, in the first process, the resin-coated permanent magnets 22 are manufactured to a size at which the gaps 28 are formed between the resin-coated permanent magnets 22 and both rotor circumferential direction end portions of the respective magnet insertion holes 20.

Figure 4B:
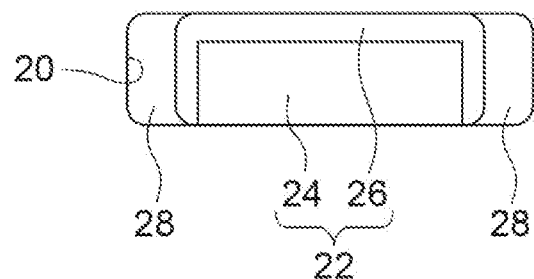
FIG. 4B is a plan view illustrating a state in which a resin-coated permanent magnet has been press-fitted into a magnet insertion hole.

Next, in the second process, the resin-coated permanent magnets 22 are press-fitted into the respective magnet insertion holes 20 in the rotor core 14 in a state in which the rotor core 14 is, for example, placed on a non-illustrated pallet (see FIG. 4B). This press-fitting is for example performed using a feeder unit (not illustrated in the drawings) provided with clamps capable of gripping leading end portions of the resin-coated permanent magnets 22. Moreover, this press-fitting is performed in a state in which the rotor core 14 and the resin-coated permanent magnets 22 are at room temperature. The magnet insertion holes 20 are enlarged as a result of this press-fitting.

Figure 4C:
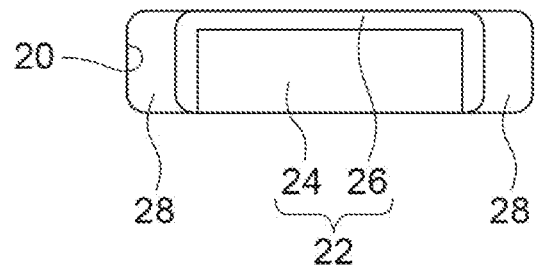
FIG. 4C is a plan view illustrating a state in which a rotor core including a resin-coated permanent magnet press-fitted into a magnet insertion hole has been heated to a temperature that is at least a temperature at which resin of the resin-coated permanent magnets softens.

Next, in the third process, the post-second-process rotor core 14 is heated to a temperature that is at least a softening temperature of the resin 26 (see FIG. 4C). This heating is for example performed using a heating device such as a heater provided to the above-mentioned pallet. When the resin 26 has been softened by this heating, the magnet insertion holes 20 that were enlarged by the press-fitting contract. As the magnet insertion holes 20 contract, the softened resin 26 is pressed in the rotor radial direction against the inner wall faces of the magnet insertion holes 20 and deformed so as to be fitted closely against the undulations of the (radial outside) inner wall faces of the magnet insertion holes 20. Note that this heating requires the temperature to be adjusted to a level that does not cause the resin 26 to melt and begin to flow.

Next, in the fourth process, for example cooling water is passed through flow channels provided in the above-mentioned pallet in order to perform gradual temperature-controlled cooling of the post-third process rotor core 14. The magnet insertion holes 20 are thus returned to their room temperature size while maintaining the closely fitted state described above. This completes the rotor 10. Note that there is no limitation to cooling by water-cooling in the fourth process described above, and for example air-cooling may be performed using a fan. Alternatively, forced cooling may be performed following a fixed period of natural cooling.

Second Manufacturing Method

Figure 5A:
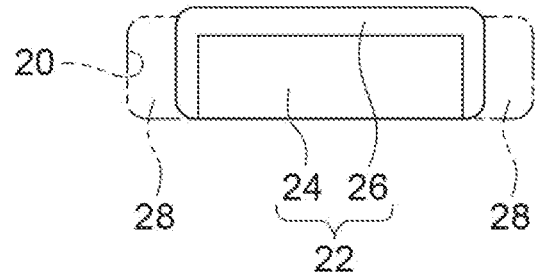
FIG. 5A is a plan view illustrating a state prior to press-fitting a resin-coated permanent magnet into a magnet insertion hole in a second manufacturing method.

In the first process of the second manufacturing method, similarly to in the first process of the first manufacturing method, the permanent magnets 24 and the resin 26 are integrated together by insert molding, and the resin-coated permanent magnets 22 are manufactured so as to be larger in the rotor radial direction than the magnet insertion holes 20 in the rotor core 14 at room temperature (see FIG. 5A).

Next, in the second process, the rotor core 14 is placed on a non-illustrated pallet, and the rotor core 14 is heated by a heating device such as a heater provided to the pallet. When this is performed, the rotor core 14 is heated to a temperature that is at least a temperature at which the magnet insertion holes 20 enlarge to a size to allow contact-free insertion of the resin-coated permanent magnets 22 and that is also at least a temperature at which the resin 26 softens. This heating requires the temperature to be adjusted to a level that does not cause the resin 26 to melt and begin to flow.

Figure 5B:
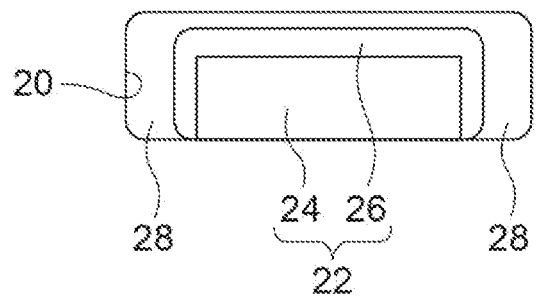
FIG. 5B is a plan view illustrating a state in which a rotor core has been heated to a temperature that is a temperature at which a magnet insertion hole enlarges to a size to allow contact-free insertion of a resin-coated permanent magnet and that is also at least a temperature at which resin of the resin-coated permanent magnet softens, and the resin-coated permanent magnet has been inserted into the magnet insertion hole in the rotor core.
Figure 5C:
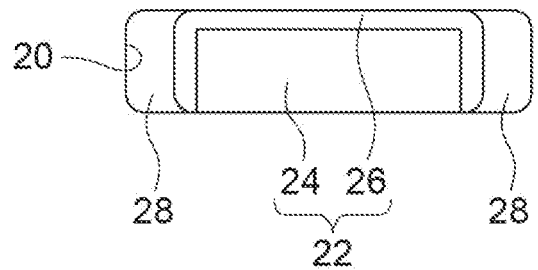
FIG. 5C is a plan view illustrating a state in which a rotor core in which a resin-coated permanent magnet has been inserted into a magnet insertion hole has been cooled.

Next, in the third process, the resin-coated permanent magnets 22 are inserted into the magnet insertion holes 20 in the rotor core 14 in the heated state by the second process (see FIG. 5B). This insertion is, for example, performed by a feeder unit (not illustrated in the drawings) provided with clamps capable of gripping leading end portions of the resin-coated permanent magnets 22. Moreover, this insertion is performed such that the resin-coated permanent magnets 22 do not contact the inner wall faces of the magnet insertion holes 20 that have been enlarged by the above-described heating. When the resin-coated permanent magnets 22 are inserted into the magnet insertion holes 20, the resin 26 is softened using radiant heat from the rotor core 14.

Next, in the fourth process, for example cooling water is passed through flow channels provided in the above-mentioned pallet in order to perform gradual temperature-controlled cooling of the post-third process rotor core 14. The magnet insertion holes 20 that have been enlarged as described above thus begin to contract. As the magnet insertion holes 20 contract, the softened resin 26 is pressed in a rotor radial direction against the inner wall faces of the magnet insertion holes 20 and deformed so as to be fitted closely against the undulations of the inner wall faces of the magnet insertion holes 20. The magnet insertion holes 20 are then returned to their room temperature size while maintaining this closely fitted state (see FIG. 5C). This completes the rotor 10. Note that there is no limitation to cooling by water-cooling in the fourth process, and for example air-cooling may be performed using a fan. Alternatively, forced cooling may be performed following a fixed period of natural cooling.

Next, explanation follows regarding operation and advantageous effects of the present exemplary embodiment.

In the present exemplary embodiment, the first and second manufacturing methods are manufacturing methods for the rotor 10. According to the first manufacturing method, in the first process, the permanent magnets 24 and the resin 26 are integrated together to manufacture the resin-coated permanent magnets 22 that are capable of being press-fitted into the magnet insertion holes 20 in the rotor core 14. Next, in the second process, the resin-coated permanent magnets 22 are press-fitted into the magnet insertion holes 20 in the rotor core 14. Next, in the third process, the post-second-process rotor core 14 is heated to a temperature that is at least the temperature at which the resin 26 softens. Accordingly, the softened resin 26 is pressed in the rotor radial direction against the inner wall faces of the magnet insertion holes 20 and deformed so as to be fitted closely against the undulations of the inner wall faces of the magnet insertion holes 20. Next, in the fourth process, the rotor core 14 that was heated in the third process is cooled, such that the magnet insertion holes 20 are returned to their room temperature size while maintaining this closely fitted state.

In the first manufacturing method, the resin-coated permanent magnets 22 are press-fitted into the magnet insertion holes 20 in the rotor core 14 prior to heating the rotor core 14. This enables the resin 26 to be prevented or suppressed from being locally shaved away on the side that comes into contact with edge portions at the entrances of the magnet insertion holes 20 during the press-fitting. Moreover, since the softened resin 26 is pressed in a rotor radial direction against the inner wall faces of the magnet insertion holes 20 and deformed, there is less deformation resistance of the resin 26 than in traditional configurations in which a resin portion is filled into a magnet insertion hole by being pressed in an axial direction of a rotor core. This enables the resin 26 to be well fitted closely against (filled into) the undulations of the inner wall faces of the magnet insertion holes 20. As a result, centrifugal force acting on the permanent magnets 24 as the rotor 10 rotates acts uniformly on the inner wall faces of the magnet insertion holes 20, thereby enabling premature damage of the rotor core 14 due to local concentrations of the centrifugal force on the inner wall faces of the magnet insertion holes 20 to be prevented.

Moreover, according to the second manufacturing method, in the first process, the permanent magnet 24 and the resin 26 are integrated together to manufacture the resin-coated permanent magnets 22 that are larger in the rotor radial direction than the magnet insertion holes 20 in the rotor core 14. Next, in the second process, the rotor core 14 is heated to a temperature that is at least the temperature at which the magnet insertion holes 20 enlarge to a size to allow contact-free insertion of the resin-coated permanent magnets 22 and that is also at least a temperature at which the resin 26 softens. Next, in the third process, the resin-coated permanent magnets 22 are inserted into the magnet insertion holes 20 in the rotor core 14 in the heated state achieved by the second process. The resin 26 of the resin-coated permanent magnets 22 is thus softened using radiant heat from the rotor core 14. Next, in the fourth process, the post-third process rotor core 14 is cooled. The magnet insertion holes 20 that have been enlarged by the above-described heating contract as a result, such that the softened resin 26 is pressed in the rotor radial direction against the inner wall faces of the magnet insertion holes 20 and deformed so as to be fitted closely against the undulations of the inner wall faces of the magnet insertion holes 20. The magnet insertion holes 20 are then returned to their room temperature size while maintaining this closely fitted state.

In the second manufacturing method, the resin-coated permanent magnets 22 are inserted into the magnet insertion holes 20 that have been enlarged by the above-described heating. This enables the resin 26 to be prevented from being locally shaved away by coming into contact with edge portions at the entrances of the magnet insertion holes 20. Moreover, since the softened resin 26 is pressed in the rotor radial direction against the inner wall faces of the magnet insertion holes 20 and deformed, there is less deformation resistance of the resin 26 than in traditional configurations in which a resin portion is filled into a magnet insertion hole by being pressed in an axial direction of a rotor core. This enables the resin 26 to be well fitted closely against (filled into) the undulations of the inner wall faces of the magnet insertion holes 20. As a result, centrifugal force acting on the permanent magnets 24 as the rotor 10 rotates acts uniformly on the inner wall faces of the magnet insertion holes 20, thereby enabling premature damage of the rotor core 14 due to local concentrations of the centrifugal force on the inner wall faces of the magnet insertion holes 20 to be prevented.

In the first and second manufacturing methods described above, in the first process, the resin 26 is only adhered to the rotor radial outer side faces 24B from out of the rotor radial outer side faces 24B and the rotor radial inner side faces 24D of the permanent magnets 24 when manufacturing the resin-coated permanent magnets 22. Thus, when the resin-coated permanent magnets 22 are placed in the magnet insertion holes 20 in the rotor core 14, the resin 26 is not present at the rotor radial inside of the permanent magnets 24, but the resin 26 is present at the rotor radial outside of the permanent magnets 24. Although an increased centrifugal force from the permanent magnets 24 is applied to the inner wall faces of the magnet insertion holes 20 at the rotor radial outside of the permanent magnets 24 as the rotor 10 rotates, since the resin 26 is well fitted closely against the undulations of the inner wall faces of the magnet insertion holes 20, this centrifugal force is applied uniformly to the inner wall faces of the magnet insertion holes 20. Moreover, the quantity of the resin 26 employed can be reduced in comparison to configurations in which the resin 26 is also present at the rotor radial inside of the permanent magnets 24, thus contributing to a reduction in weight and a reduction in manufacturing costs of the rotor 10.

Moreover, the resin-coated permanent magnets 22 manufactured in the first process described above are formed to a size at which the gaps 28 are formed between the resin-coated permanent magnets 22 and both rotor circumferential direction end portions of the respective magnet insertion holes 20 in a state in which the resin-coated permanent magnets 22 have been placed in the magnet insertion holes 20. Accordingly, in the second process, when the end portions of the resin-coated permanent magnets 22 are press-fitted or inserted into the magnet insertion holes 20 while the end portions of the resin-coated permanent magnets 22 are gripped by leading end portions of a clamp, the leading end portions of the clamp can be inserted into the gaps 28. This enables the configuration of the clamp used to grip the end portions of the resin-coated permanent magnets 22 to be simplified.

Moreover, in the rotor 10 according to the present exemplary embodiment, the resin 26 that is interposed between the permanent magnets 24 and the inner wall faces of the magnet insertion holes 20 is pressed in the rotor radial direction against the inner wall faces of the magnet insertion holes 20 and deformed, resulting in a smaller deformation amount of the resin 26 than in traditional configurations in which a resin portion is filled into a magnet insertion hole by pressing the resin portion in the axial direction of a rotor core. Since the residual stress at the peripheral portions of the magnet insertion holes 20 in the rotor core 14 is set to no greater than 10 MPa, deformation of these peripheral portions over time can be suppressed, enabling premature damage of the rotor core 14 accompanying such deformation to be prevented.

Various Modified Examples of Resin-Coated Permanent Magnets

Next, explanation follows regarding various modified examples of the resin-coated permanent magnets 22 according to the exemplary embodiment described above, with reference to FIG. 6A to FIG. 9C. The modified examples illustrated in FIG. 6A to FIG. 9C are manufactured during the first process described above. Note that in FIG. 6A to FIG. 9C, configurations similar to those of the resin-coated permanent magnets 22 according to the exemplary embodiment described above are allocated the same reference numerals as in the exemplary embodiment described above.

First Modified Example

Figure 6A:
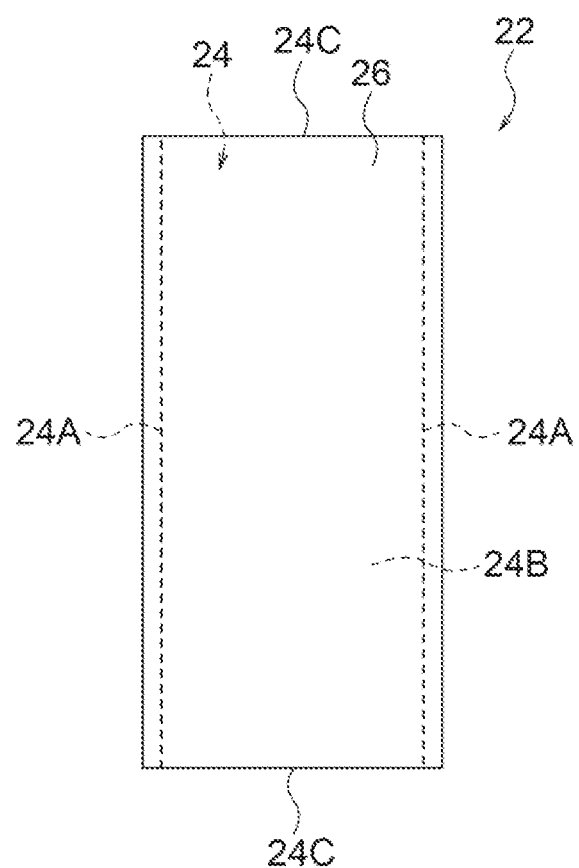
FIG. 6A is a front view illustrating a first modified example of a resin-coated permanent magnet.
Figure 6B:
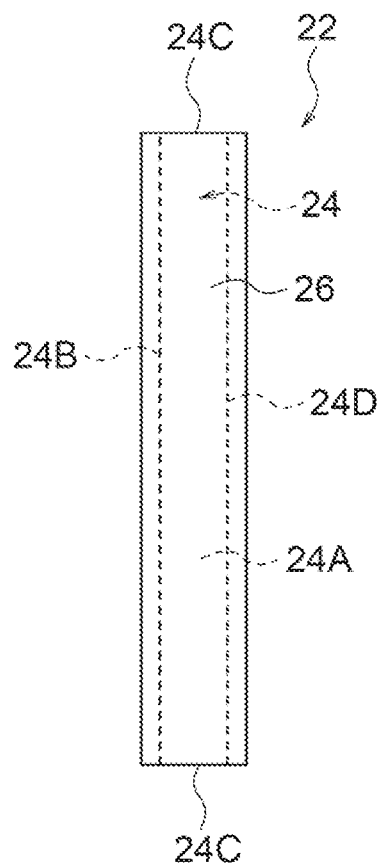
FIG. 6B is a side view illustrating the first modified example.
Figure 6C:
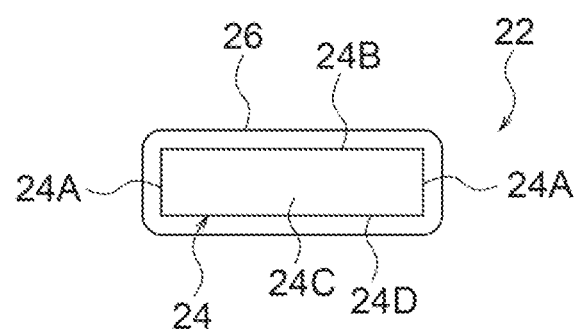
FIG. 6C is a plan view illustrating the first modified example.

As illustrated in a first modified example illustrated in FIG. 6A to FIG. 6C, configuration may be made such that the resin 26 is adhered to both the rotor radial outer side face 24B and the rotor radial inner side face 24D of the permanent magnet 24. Although not illustrated in the drawings, configuration may be made such that the resin 26 is also adhered to both length direction end portions of the permanent magnets 24 (to achieve a configuration in which the permanent magnets 24 is completely embedded in the resin 26).

Second Modified Example

Figure 7B:
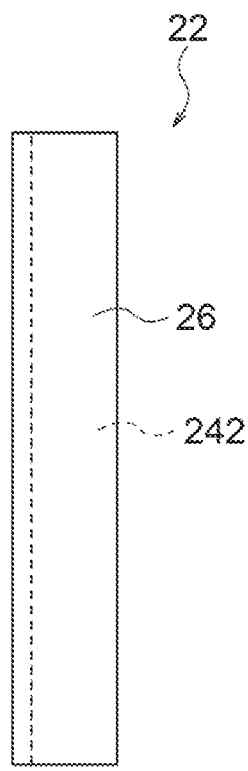
FIG. 7B is a side view illustrating the second modified example.
Figure 7C:
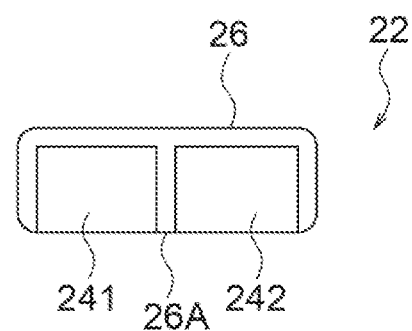
FIG. 7C is plan view illustrating the second modified example.

In a second modified example illustrated FIG. 7A to FIG. 7C, plural (two in this example) permanent magnets 241, 242 divided in the width direction of the resin-coated permanent magnet 22 are integrated together with the resin 26, such that the permanent magnets 241, 242 are insulated by an insulation portion 26A provided to the resin 26. In a rotor 10 in which such resin-coated permanent magnets 22 are placed in the magnet insertion holes 20 in the rotor core 14, placing the plural permanent magnets 241, 242 in each of the magnet insertion holes 20 enables the formation of eddy currents to be suppressed. Moreover, by integrating together the plural permanent magnets 241, 242 and the resin 26 as described above, the number of processes can be reduced in comparison to cases in which the plural permanent magnets 241, 242 are placed in the magnet insertion holes 20 separately.

Third Modified Example

Figure 8A:
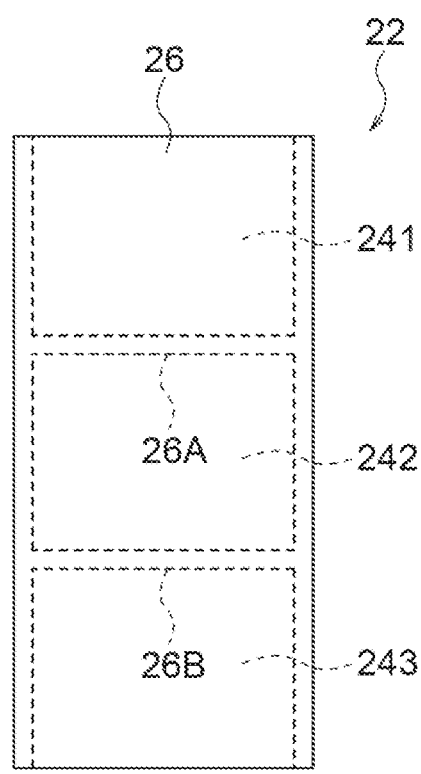
FIG. 8A is a front view illustrating a third modified example of a resin-coated permanent magnet.
Figure 8B:
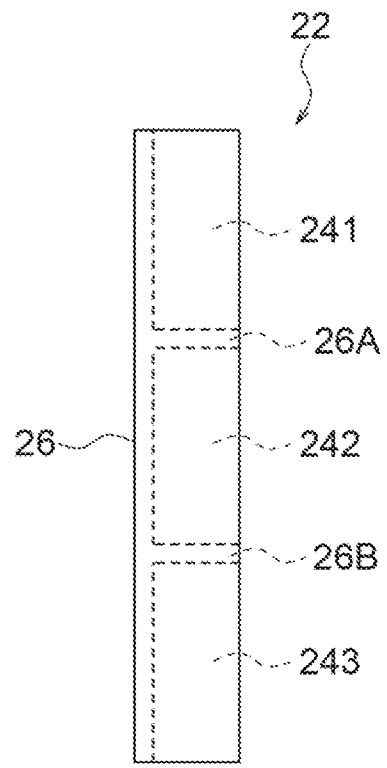
FIG. 8B is a side view illustrating the third modified example.
Figure 8C:
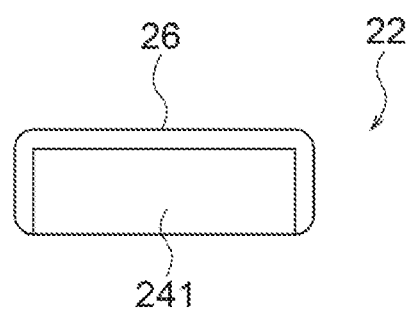
FIG. 8C is a plan view illustrating the third modified example.

In a third modified example illustrated in FIG. 8A to FIG. 8C, plural (three in this example) permanent magnets 241, 242, 243 divided in the length direction of the resin-coated permanent magnet 22 are integrated together with the resin 26, and the permanent magnets 241, 242, 243 are insulated by insulation portions 26A, 26B provided to the resin 26. The third modified example obtains similar advantageous effects to the second modified example.

Fourth Modified Example

Figure 9B:
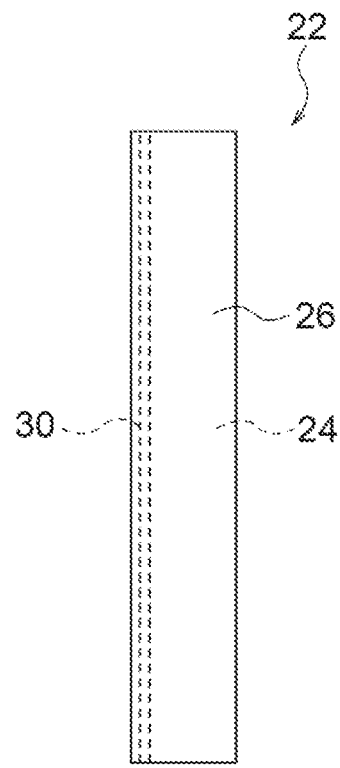
FIG. 9B is a side view illustrating the fourth modified example.
Figure 9C:
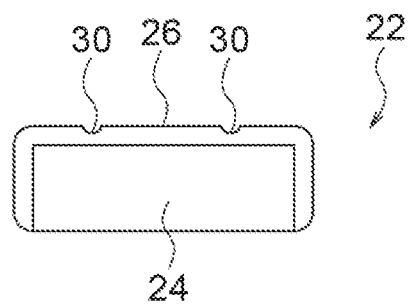
FIG. 9C is a plan view illustrating the fourth modified example.

In a fourth modified example illustrated in FIG. 9A to FIG. 9C, one or plural (two in this example) grooves 30 are formed extending along the length direction of the resin-coated permanent magnet 22 at a location where the resin 26 is to be fitted closely against the inner wall face of the magnet insertion hole 20. In the fourth modified example, when the softened resin 26 is pressed against the inner wall face of the magnet insertion hole 20, any air present between the two can be expelled from between the two via the grooves 30. This enables any detriment to the close fit between the resin 26 and the inner wall faces of the magnet insertion holes 20 due to the presence of air to be prevented or suppressed.

Modified Example of First Process

Figure 10A:
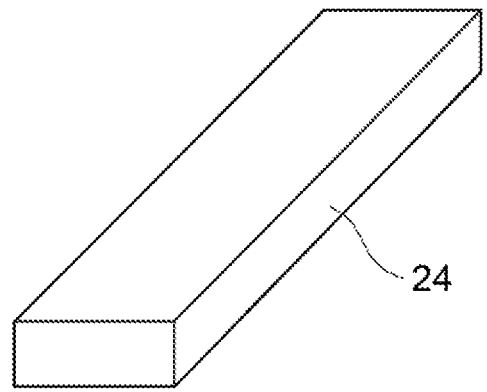
FIG. 10A is a perspective view illustrating a permanent magnet prior to blasting in a modified example of a first process.
Figure 10B:
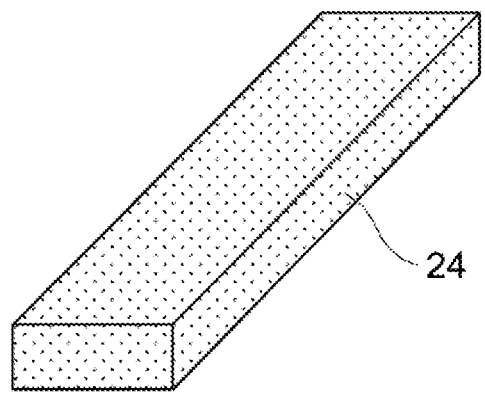
FIG. 10B is a perspective view illustrating a permanent magnet after blasting in the modified example of the first process.
Figure 10C:
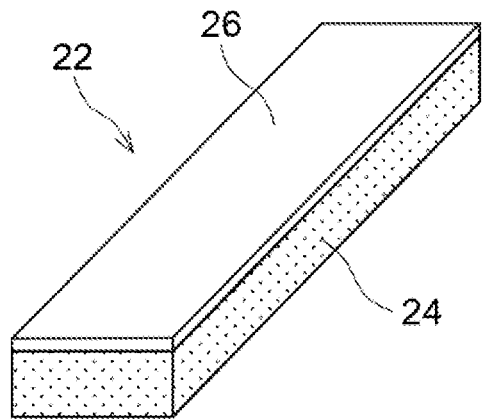
FIG. 10C is a perspective view illustrating a resin-coated permanent magnet manufactured in the modified example of the first process.
Figure 11:
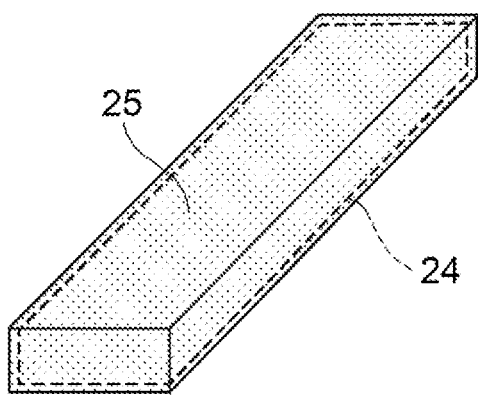
FIG. 11 is a perspective view illustrating a resin-coated permanent magnet that has been blasted in a modified example of the first process.

In a modified example illustrated in FIG. 10A to FIG. 10C, in the first process, additional surface processing is applied in order to improve the close fit between the permanent magnet 24 and the resin 26. Specifically, the surface of the permanent magnet 24 illustrated in FIG. 10A is subjected to roughening processing (for example blasting, polishing, laser processing, or chemical processing), as illustrated in FIG. 10B. The resin 26 is then molded to the desired faces of the permanent magnet 24 as illustrated in FIG. 10C. Note that there is no limitation to directly subjecting the surfaces of the permanent magnets 24 to roughening processing as illustrated in FIG. 10B, and configuration may be made such that the surface of a permanent magnet 24 that has been coated with a resin 25 is subjected to roughening processing, as illustrated in FIG. 11.

The addition of surface processing such as that described above enables separation between the permanent magnet 24 and the resin 26 due to differences in linear expansion to be prevented, improving the reliability thereof as the rotor rotates. Moreover, handling is facilitated when the resin-coated permanent magnets 22 are press-fitted or inserted into the magnet insertion holes 20. Moreover, the resin 26 can be molded to any desired faces of the permanent magnets 24.

Note that although the rotor 10 is an in-runner type rotor in the exemplary embodiment described above, there is no limitation thereto, and the rotor according to the present disclosure may be an out-runner type rotor.

Various other modifications may be implemented within a range that does not depart from the spirit of the present disclosure. Obviously, the scope of rights of the present disclosure is not limited to the exemplary embodiment described above.

The disclosure of Japanese Patent Application No. 2019-003620, filed on Jan. 11, 2019, is incorporated in its entirety by reference herein. All cited documents, patent applications, and technical standards mentioned in the present specification are incorporated by reference in the present specification to the same extent as if each individual cited document, patent application, or technical standard was specifically and individually indicated to be incorporated by reference.

The invention claimed is:

1. A manufacturing method for a rotor including a rotor core configured by laminated steel plates and by a magnet insertion hole extending along an axial direction of the rotor core, with a resin interposed between a permanent magnet placed in the magnet insertion hole and an inner wall face of the magnet insertion hole, the rotor manufacturing method comprising:
 a first process of integrating the permanent magnet and the resin together to manufacture a resin-coated permanent magnet capable of being press-fitted into the magnet insertion hole;
 a second process of press-fitting the resin-coated permanent magnet into the magnet insertion hole in a state in which the resin-coated permanent magnet and the rotor core are at room temperature, wherein the magnet insertion hole is enlarged as a result of the press-fitting;
 a third process of heating the post-second-process rotor core to a temperature that is at least a temperature at which the resin softens, wherein the magnet insertion holes that were enlarged by the press-fitting contract during the third process; and
 a fourth process of cooling the post-third process rotor core.

2. The rotor manufacturing method of claim 1, wherein, of a rotor radial outer side face and a rotor radial inner side face of the permanent magnet, in the first process, the resin is only adhered to the rotor radial outer side face.

3. The rotor manufacturing method of claim 1, wherein, in the first process, the resin-coated permanent magnet is manufactured to a size at which a gap is formed between the resin-coated permanent magnet and both rotor circumferential direction end portions of the magnet insertion hole.

4. The rotor manufacturing method of claim 1, wherein, in the first process, a plurality of permanent magnets are integrated together with the resin.

5. The rotor manufacturing method of claim 1, wherein, in the first process, a surface of the permanent magnet or of the permanent magnet coated with resin is subjected to roughening processing prior to integrating the permanent magnet and the resin together.

6. A manufacturing method for a rotor including a rotor core configured by laminated steel plates and by a magnet insertion hole extending along an axial direction of the rotor core, with a resin interposed between a permanent magnet placed in the magnet insertion hole and an inner wall face of the magnet insertion hole, the rotor manufacturing method comprising:
 a first process of integrating the permanent magnet and the resin together to manufacture a resin-coated permanent magnet larger than the magnet insertion hole in a rotor radial direction;
 a second process of heating the rotor core to a temperature that is at least a temperature at which the magnet insertion hole enlarges to a size to allow contact-free insertion of the resin-coated permanent magnet and that is also at least a temperature at which the resin softens;
 a third process of inserting the resin-coated permanent magnet into the magnet insertion hole in the rotor core in a heated state achieved by the second process; and
 a fourth process of cooling the post-third process rotor core.

7. The rotor manufacturing method of claim 6, wherein, of a rotor radial outer side face and a rotor radial inner side face of the permanent magnet, in the first process, the resin is only adhered to the rotor radial outer side face.

8. The rotor manufacturing method of claim 6, wherein, in the first process, the resin-coated permanent magnet is manufactured to a size at which a gap is formed between the resin-coated permanent magnet and both rotor circumferential direction end portions of the magnet insertion hole.

9. The rotor manufacturing method of claim 6, wherein, in the first process, a plurality of permanent magnets are integrated together with the resin.

10. The rotor manufacturing method of claim 6, wherein, in the first process, a surface of the permanent magnet or of the permanent magnet coated with resin is subjected to roughening processing prior to integrating the permanent magnet and the resin together.

* * * * *